United States Patent [19]

Ueki et al.

[11] Patent Number: 4,910,960
[45] Date of Patent: Mar. 27, 1990

[54] EXHAUST CONTROL SYSTEM ON INTERNAL COMBUSTION ENGINE

[75] Inventors: Tetsuo Ueki, Tokyo; Motohiro Inaba, Fujisawa, both of Japan

[73] Assignees: Nissan Motor Col, Ltd., Yokohama City; Calsonic Corporation, Tokyo, both of Japan

[21] Appl. No.: 327,657

[22] Filed: Mar. 23, 1989

[30] Foreign Application Priority Data

Mar. 31, 1988 [JP] Japan .............................. 63-43110[U]

[51] Int. Cl.⁴ ............................................ F02B 27/02
[52] U.S. Cl. ........................................ 60/312; 60/324
[58] Field of Search ................ 60/274, 286, 288, 312, 60/324; 123/323

[56] References Cited

U.S. PATENT DOCUMENTS 4,462,208 7/1984 Hicks ...................................... 60/286
4,558,565 12/1985 Kojima ................................... 60/286
4,665,692 5/1987 Inaba ...................................... 60/312

Primary Examiner—Douglas Hart
Attorney, Agent, or Firm—Pennie & Edmonds

[57] ABSTRACT

Disclosed herein is an exhaust control system of an internal combustion engine. The exhaust control system comprises an electrically controlled valve installed in one of two tail pipes of a muffler; an engine speed sensor; an exhaust gas temperature sensor; a first control circuit for causing the valve to assume selectively a pipe closing position when the engine speed is lower than a reference level, and a pipe opening position when the engine speed is equal to or higher than the reference level; and a second control circuit for varying the reference level in accordance with the temperature of the exhaust gas.

4 Claims, 2 Drawing Sheets

EXHAUST CONTROL SYSTEM ON INTERNAL COMBUSTION ENGINE

BACKGROUND OF THE INVENTION

1. Field of the Invention

The present invention relates in general to exhaust control systems of an internal combustion engine, and more particularly, to exhaust control systems of a type which is designed to reduce the noise of the combustion and exhaust of the engine.

2. Description of the Prior Art

In order to clarify the task of the present invention, one conventional exhaust control system of the above-mentioned type will be outlined with reference to FIG. 4 of the accompanying drawings, which is disclosed in Japanese Utility Model First Provisional Publication No. 61-118914.

As is seen from the drawing, the system comprises an electrically controlled valve 101 which is installed in one of tail pipes 100a and 100b of a muffler 100 to which an exhaust tube 104 extending from an internal combustion engine (not shown) is connected. The valve 101 is controlled by a control device 16 which comprises an engine speed sensor 108, a control circuit 110 and an actuator 112. That is, when the engine speed sensor 108 senses that the engine speed exceeds a predetermined level (for example, 2500 rpm), the control circuit 110 causes the actuator 112 to open the valve 102. With this, output of the engine is increased. While, when the engine speed is sensed under the given degree, the valve 102 is closed to improve the noise muffling effect of the muffler 100.

However, due to its inherent construction, the conventional system has the following drawback.

That is, the characteristic of the exhaust sound pressure varies depending on the temperature of the exhaust gas. This will be understood from the graph of FIG. 3 in which the exhaust sound pressure at low temperature is depicted by a broken line, while, the sound pressure at high temperature is by a solid line. From this graph, it will be appreciated that with increase in temperature of the exhaust gas, the same sound pressure level of the exhaust gas shifts toward a higher engine speed side. That is, the same sound pressure level "P" of the exhaust gas appears at the engine speed "M" when the gas temperature is low, but appears at the higher engine speed "N" when the gas temperature is high.

Since the conventional exhaust control system is constructed without respect to the above-mentioned exhaust sound pressure characteristic, the same has failed to exhibit a satisfied performance.

SUMMARY OF THE INVENTION

It is therefore an object of the present invention to provide an exhaust control system which is constructed by embodying the above-mentioned exhaust sound pressure characteristic.

According to the present invention, there is provided an exhaust control system in which the timing when opening/closing of a valve in a tail pipe of the muffler is carried out varies in accordance with the temperature of the exhaust gas as well as the engine speed.

According to the present invention, there is provided an exhaust control system in an internal combustion engine having an exhaust system which includes a muffler and at least two tail pipes connected to the muffler. The exhaust control system comprises an electrically controlled valve installed in one of the tail pipes, the valve being operable to assume a close position to close the tail pipe and an open position to open the same; an engine speed sensor issuing an engine speed signal representative of the rotation speed of the engine; a temperature sensor issuing an exhaust temperature signal representative of the temperature of exhaust gas produced by the engine; first means for causing the valve to assume selectively the close position when the engine speed signal represents that the engine speed is lower than a reference level, and the open position when the engine sped signal represents that the engine speed is equal to or higher than the reference level; and second means for varying the reference level in accordance with the temperature of the exhaust gas.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
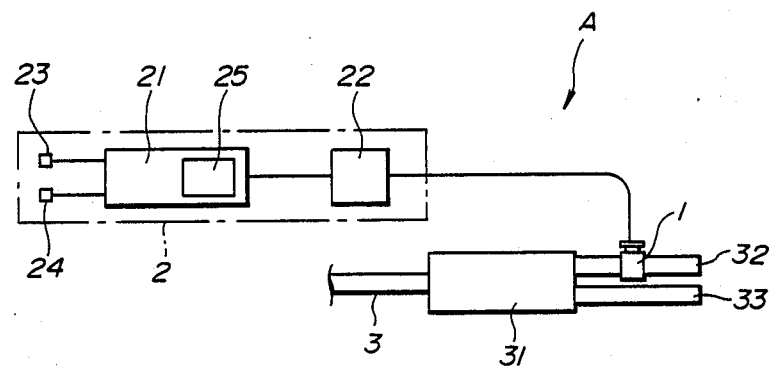
FIG. 1 is a block schematic diagram of an exhaust control system according to the present invention.

Referring to FIG. 1, there is shown an exhaust control system of the present invention, which is generally designated by reference "A".

The system "A" comprises generally an electrically controlled valve 1 and a control device 2.

The valve 1 is operatively installed in one (viz., the pipe 32) of two tail pipes 32 and 33 of a muffler 31 to which an exhaust tube 3 extending from an internal combustion engine (not shown) is connected. The valve 1 is constructed and arranged to turn between a close position to fully close the pipe 32 and an open position to fully open the same.

The control device 2 comprises a control circuit 21 and an actuator 22. An engine speed sensor 23 and an exhaust gas temperature sensor 24 are connected to the control circuit 21 to feed the control circuit 21 with signals representative of engine speed and exhaust gas temperature respectively. The control circuit 21 is provided by a computer.

Figure 3:
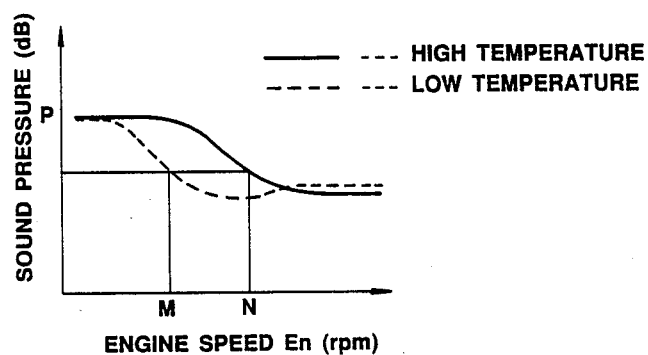
FIG. 3 is a graph showing the sound pressure characteristic of exhaust gas with respect to engine speed and exhaust gas temperature.
Figure 4:
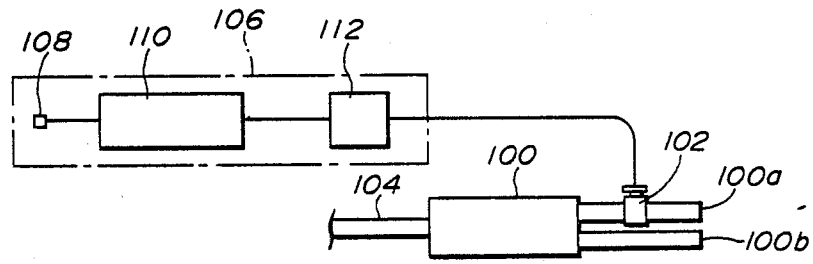
FIG. 4 is a view similar to FIG. 1, but showing a conventional exhaust control system.

Basically, in the invention, similar to the above-mentioned conventional system, when the engine speed sensor 23 senses that the engine speed "$E_n$" is equal to or higher than a reference level "$E_o$", the control circuit 21 causes the actuator 22 to open the valve 1, while, when the engine speed sensor 23 senses the engine speed "$E_n$" being lower than the reference level "$E_o$", the control circuit 21 causes the actuator 22 to close the valve 1. The reason of employing this operation will be understood from the graph of FIG. 3 which shows that the exhaust sound pressure is relatively high when the engine speed "$E_n$" is low. That is, when the engine speed is within a low range, the valve 1 is actuated to close the tail pipe 32 to reduce the exhaust noise, while, when the engine speed is within a high range, the valve 1 is actuated to open the tail pipe 32 to assure increase in output of the engine.

In accordance with the present invention, the control circuit 21 has therein a so-called "reference engine speed determining circuit" 25 which changes the reference level "$E_o$" of the engine speed in accordance with temperature of the exhaust gas. That is, when the temperature sensor 24 senses that the exhaust gas temperature "$t_n$" is lower than a predetermined level "$t_o$", the circuit 25 determines the reference level "$E_o$" to a lower reference level "$El_o$" (viz., lower engine speed reference level), while, when the temperature sensor 24 senses that the exhaust gas temperature "$t_n$" is equal to or higher than the predetermined level "$t_o$", the circuit 25 determines the reference level "$E_o$" to a higher reference level "$Eh_i$" (viz., higher engine speed reference level). I is to be noted that the higher engine speed reference level is higher than the lower. The reason of employing this operation will be understood from the graph of FIG. 3. That is, the relationship between the engine rotation speed $E_n$ and the exhaust sound pressure differs when the temperature of the exhaust gas changes. More specifically, the exhaust sound level "P" which requires the opening/closing of the valve 1 appears at a lower engine speed "M" when the exhaust gas temperature is low, but appears at a higher engine speed "N" when the exhaust gas temperature is high.

It is to be noted that the above-mentioned lower and higher reference levels "$El_o$" and "$Eh_i$" correspond to the engine speeds "M" and "N", respectively.

Figure 2:
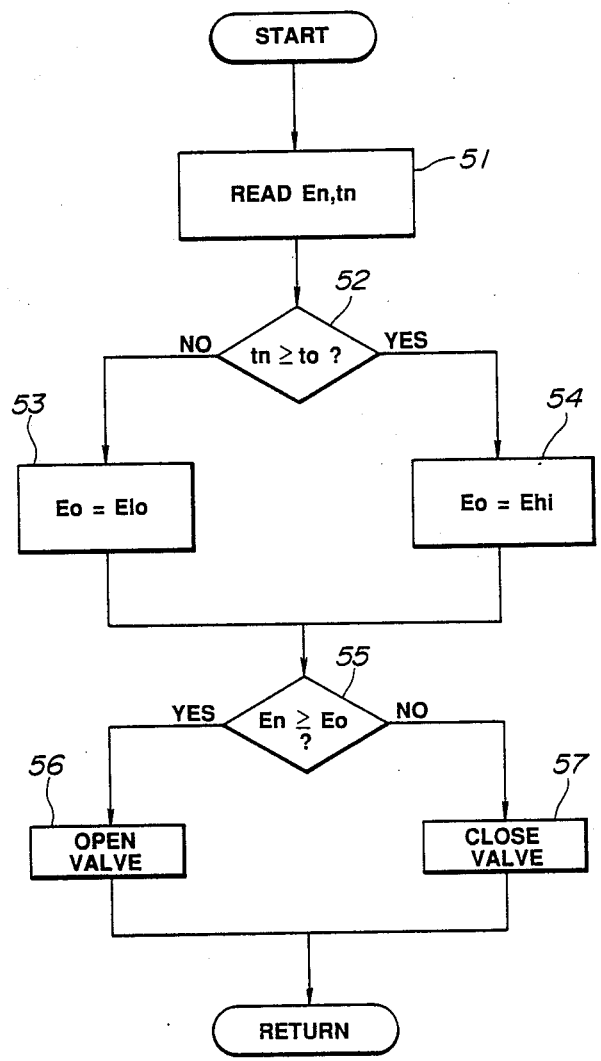
FIG. 2 is a flowchart showing operation steps which are carried out in a control circuit employed in the invention.

In the following, the operation steps carried out in the control circuit 21 will be described with reference to the flowchart of FIG. 2.

At step 51, signals representative of engine speed "$E_n$" and exhaust gas temperature "$t_n$", which are issued from the engine speed sensor 23 and the exhaust gas temperature sensor 24, are read.

At step 52, judgement as to whether or not the exhaust as temperature "$t_n$" is equal to or higher than a predetermined level "$t_o$" is carried out.

When it is judged that "$t_n$" is lower than "$t_o$", the operation is advanced to step 53 where the reference engine speed "$E_o$" is determined to the lower reference level "$El_o$" (viz., $E_n = El_o$), and then advanced to step 55 where a judgment as to whether or not the existing engine speed "$E_n$" is equal to or higher than the lower reference level "$El_o$" is carried out. When it is judged that "$E_n$" is equal to or higher than "$El_o$" (viz., $E_n \geq El_o \rightarrow$ YES), the operation is advanced to step 56 where the actuator 22 is caused to open the valve 1, while, when it is judged that "$E_n$" is lower than "$El_o$" (viz., $E_n \geq El_o \rightarrow$ NO), the operation is advanced to step 57 where the actuator 22 is caused to close the valve 1.

When, at step 52, it is judged that "$t_n$" is equal to or higher than "$t_o$", the operation is advanced to step 54 where the reference engine speed "$E_o$" is determined to the higher reference level "$Eh_i$" (viz., $E_n = Eh_i$), and then advanced to step 55 where a judgment a to whether or not the existing engine speed "$E_n$" is equal to or higher than the higher reference level "$Eh_i$" is carried out. When it is judged that "$E_n$" is equal to or higher than "$Eh_i$" (viz., $E_n \geq Eh_i \rightarrow$ YES), the operation is advanced to step 56 where the actuator 22 is caused to open the valve 1, while, when it is judged that "$E_n$" is lower than "$Eh_i$" (viz., $E_n \geq Eh_i \rightarrow$ NO), the operation is advanced to step 57 where the actuator 22 is caused to close the valve 1.

As will be understood from the foregoing description, in the present invention, the reference engine speed "$E_o$" is caused to switch between the lower and higher references levels "$El_o$" and "$Eh_i$" in accordance with the exhaust gas temperature. Thus, the opening/closing operation of the valve 1 is optimally carried out in compliance with the exhaust sound pressure characteristic in both cases wherein the exhaust gas temperature is relatively high and low.

What is claimed is:

1. In an internal combustion engine having an exhaust system including a muffler and at least two tail pipes connected to said muffler, an exhaust control system comprising:

an electrically controlled valve installed in one of said tail pipes, said valve being operable to assume a closed position to close the tail pipe and an open position to open the same;

an engine speed sensor issuing an engine speed signal representative of the rotation speed of said engine;

a temperature sensor issuing an exhaust temperature signal representative of the temperature of exhaust gas produced by said engine;

first means for causing said valve to assume selectively said closed position when said engine speed signal represents that the engine speed is lower than a reference level, and said open position when said engine speed signal represents that the engine speed is equal to or higher than said reference level; and second means for varying said reference level in accordance with the temperature of the exhaust gas.

2. An exhaust control system as claimed in claim 1, in which said second means is so constructed as to determine said reference level to a lower level when the exhaust gas temperature is relatively low, and to determine said reference level to a higher level when the exhaust gas temperature is relatively high, said lower level being smaller than said higher level.

3. An exhaust control system as claimed in claim 2, in which said second means is so constructed as to determine sad reference level to said lower level when said exhaust temperature signal represents that the exhaust gas temperature is lower than a predetermined level, and to determine said reference level to said higher level when said exhaust temperature signal represents that the exhaust gas temperature is equal to or higher than said predetermined level.

4. An exhaust control system as claimed in claim 3, in which a computer is used for carrying out the functions of said first and second means.

* * * * *